US012686596B2

(12) United States Patent
Choi

(10) Patent No.: US 12,686,596 B2
(45) Date of Patent: Jul. 21, 2026

(54) ELEVATOR CAR EMERGENCY LADDER SYSTEMS

(71) Applicant: Otis Elevator Company, Farmington, CT (US)

(72) Inventor: Jihwan Choi, Incheon (KR)

(73) Assignee: OTIS ELEVATOR COMPANY, Farmington, CT (US)

( * ) Notice: Subject to any disclaimer, the term of this patent is extended or adjusted under 35 U.S.C. 154(b) by 1 day.

(21) Appl. No.: 18/904,232

(22) Filed: Oct. 2, 2024

(65) Prior Publication Data

US 2026/0091957 A1 Apr. 2, 2026

(51) Int. Cl.

| | |
|---|---|
| ***B66B 11/02*** | (2006.01) |
| ***B66B 5/00*** | (2006.01) |
| ***B66B 5/02*** | (2006.01) |

(52) U.S. Cl.

CPC ........ *B66B 11/0246* (2013.01); *B66B 5/0087* (2013.01); *B66B 5/027* (2013.01)

(58) Field of Classification Search

CPC .... B66B 11/0246; B66B 5/0087; B66B 5/027
See application file for complete search history.

(56) References Cited

U.S. PATENT DOCUMENTS

| | | | | |
|---|---|---|---|---|
| 11,697,573 | B2 * | 7/2023 | Rocher | B66B 9/00 187/340 |
| 2019/0233252 | A1 * | 8/2019 | Philippe | B66B 5/0087 |

FOREIGN PATENT DOCUMENTS

| | | | | | |
|---|---|---|---|---|---|
| CN | 201321322 | Y | * | 10/2009 | |
| CN | 203255823 | U | * | 10/2013 | |
| CN | 209143457 | U | * | 7/2019 | |
| CN | 113213313 | A | * | 8/2021 | B66B 5/027 |
| CN | 114455434 | A | * | 5/2022 | B66B 5/02 |
| CN | 115072515 | A | * | 9/2022 | B66B 5/02 |
| CN | 116161511 | A | * | 5/2023 | B66B 11/0226 |
| KR | 102512076 | B1 | | 3/2023 | |
| WO | WO-2019064513 | A1 | * | 4/2019 | B66B 13/30 |
| WO | 2020022686 | A | | 1/2020 | |

OTHER PUBLICATIONS

Machine Translation of CN 203255823.*
Machine Translation WO 2019/064513.*
European Search Report for application EP 25203387.3, Issued Mar. 16, 2026, 9 pages.

* cited by examiner

*Primary Examiner* — Diem M Tran
(74) *Attorney, Agent, or Firm* — CANTOR COLBURN LLP

(57) ABSTRACT

Elevator cars include a front wall panel with a car door in an opening. A storage cavity is defined within a portion of one of the front wall panel and the car door and is located behind a cab facing surface thereof. The storage cavity is defined by the cab facing surface and a side surface that defines a part of the opening when the car door is in an open state. An emergency ladder assembly is configured to be removably installed into the storage cavity. A storage opening is defined on the side surface and the emergency ladder assembly includes a cover plate configured to be removably attached to the side surface and cover the storage opening and an emergency ladder removably stored on the cover plate, with the emergency ladder being housed within the storage cavity in a stowed state.

20 Claims, 11 Drawing Sheets

ELEVATOR CAR EMERGENCY LADDER SYSTEMS

BACKGROUND

The subject matter disclosed herein generally relates to elevator systems and, more particularly, to elevator access systems and in particular to storage systems for emergency ladders in elevator cars.

Elevator systems may include emergency ladders that are stored within cabinets of the elevator car. For example, in some existing configurations, a ladder may be stored within a cabinet on a front wall of the elevator car. However, such cabinets may occupy a significant amount of space within the elevator car, thus reducing the usable space for passengers and spoiling the appearance within the elevator car. It may be beneficial to provide for improved emergency ladder storage systems and configurations for use with elevators.

SUMMARY

According to some embodiments, elevator cars are provided. The elevator cars include a front wall panel defining an opening for an elevator car door and an elevator car door arranged to open and close within the opening. A storage cavity is defined within a portion of one of the front wall panel and the elevator car door and located behind a cab facing surface thereof. The storage cavity is defined by the cab facing surface of the respective front wall panel or elevator car door and a side surface of the respective front wall panel or elevator car door. The side surface defines a part of the opening when the elevator car door is in an open state. An emergency ladder assembly is configured to be removably installed into the storage cavity. A storage opening is defined on the side surface of the respective front wall panel or elevator car door, and the emergency ladder assembly includes a cover plate configured to be removably attached to the side surface and cover the storage opening and an emergency ladder removably stored on the cover plate, wherein the emergency ladder is housed within the storage cavity in a stowed state.

In addition to one or more of the features described above, or as an alternative, further embodiments of the elevator cars may include that the emergency ladder comprises a set of ladder sections that are configured to be joined together to form an emergency ladder.

In addition to one or more of the features described above, or as an alternative, further embodiments of the elevator cars may include that the emergency ladder comprises three ladder sections.

In addition to one or more of the features described above, or as an alternative, further embodiments of the elevator cars may include one or more mounting elements arranged on the cover plate and configured to receive and support the emergency ladder thereon.

In addition to one or more of the features described above, or as an alternative, further embodiments of the elevator cars may include that the one or more mounting elements comprise bolts and locking nuts.

In addition to one or more of the features described above, or as an alternative, further embodiments of the elevator cars may include that the cover plate has a first end and a second end, wherein the first end is configured to lockingly engage with a part of the side surface that defines the storage opening and the second end is configured to releasably engage with another part of the side surface that defines the storage opening.

In addition to one or more of the features described above, or as an alternative, further embodiments of the elevator cars may include that the first end comprises a locking mechanism comprising a keyway and a rotating bracket, wherein the rotating bracket is configured to releasably engage with the side surface that defines the storage opening.

In addition to one or more of the features described above, or as an alternative, further embodiments of the elevator cars may include that the rotating bracket is configured to releasably engage with a locking tab mounted to an interior surface of the side surface that defines the storage opening.

In addition to one or more of the features described above, or as an alternative, further embodiments of the elevator cars may include that the second end comprises an engagement mechanism for engaging with the side surface that defines the storage opening.

In addition to one or more of the features described above, or as an alternative, further embodiments of the elevator cars may include that the engagement mechanism comprises a fixture assembly that defines an installation gap for releasably engaging with a portion of the side surface that defines the storage opening.

In addition to one or more of the features described above, or as an alternative, further embodiments of the elevator cars may include one or more support brackets arranged within the storage cavity and configured to support the emergency ladder when the emergency ladder is stored within the storage cavity.

In addition to one or more of the features described above, or as an alternative, further embodiments of the elevator cars may include a frame element arranged on an interior surface of the respective front wall panel or elevator car door, wherein the one or more support brackets are mounted to the frame element.

In addition to one or more of the features described above, or as an alternative, further embodiments of the elevator cars may include that the one or more support brackets are configured with padding or soft material to dampen movement and/or vibrations of the emergency ladder when stored in the storage cavity.

In addition to one or more of the features described above, or as an alternative, further embodiments of the elevator cars may include a car operating panel arranged in the front wall panel opposite the storage cavity relative to the opening for the elevator car door.

In addition to one or more of the features described above, or as an alternative, further embodiments of the elevator cars may include that the elevator car door is configured as a center opening elevator car door.

In addition to one or more of the features described above, or as an alternative, further embodiments of the elevator cars may include that the elevator car door is configured as a side opening elevator car door comprising at least two door panels.

In addition to one or more of the features described above, or as an alternative, further embodiments of the elevator cars may include that the storage cavity is defined within one panel of the at least two door panels.

In addition to one or more of the features described above, or as an alternative, further embodiments of the elevator cars may include that the elevator car door is configured as a center opening elevator car door, and the storage cavity is defined within the front wall panel.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
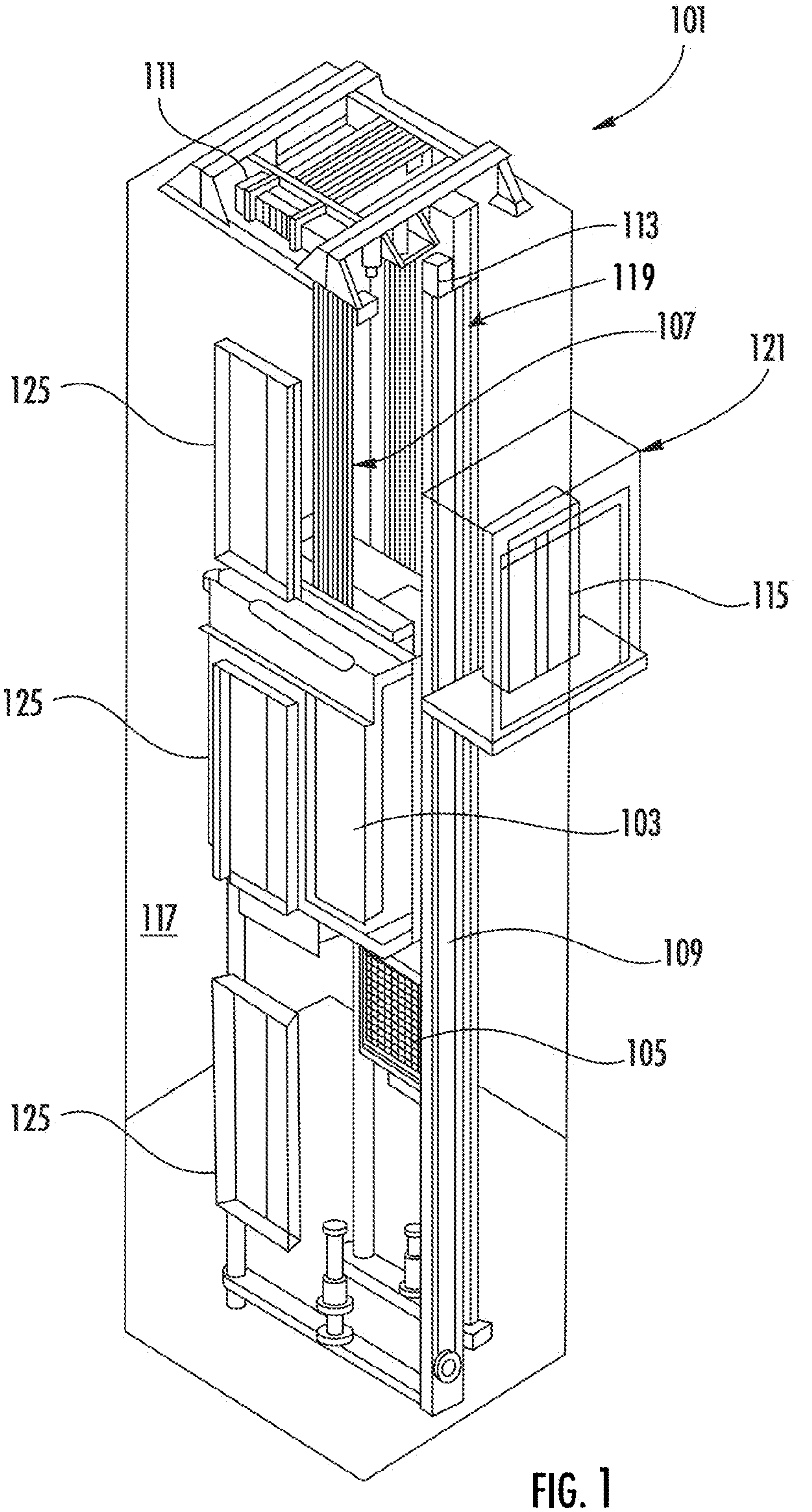
FIG. 1 is a schematic illustration of an elevator system that may employ various embodiments of the present disclosure.

FIG. 1 is a perspective view of an elevator system 101 including an elevator car 103, a counterweight 105, a roping 107, a guide rail 109, a machine 111, a position encoder 113, and an elevator controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which, in this illustrative embodiment, is part of an overhead structure of the elevator system 101, although other arrangements are possible without departing from the scope of the present disclosure. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown in the illustrative arrangement, in a controller room 121 of the elevator shaft 117 and is configured to control the operation of the elevator system 101, and particularly the elevator car 103. In other embodiments the controller 115 can be located in other locations, including, but not limited to, fixed to a landing or landing door or located in a cabinet at a landing. The elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. Although shown and described with a roping system, elevator systems that employ other methods and mechanisms of moving an elevator car within an elevator shaft may employ embodiments of the present disclosure. FIG. 1 is merely a non-limiting example presented for illustrative and explanatory purposes.

Figure 2:
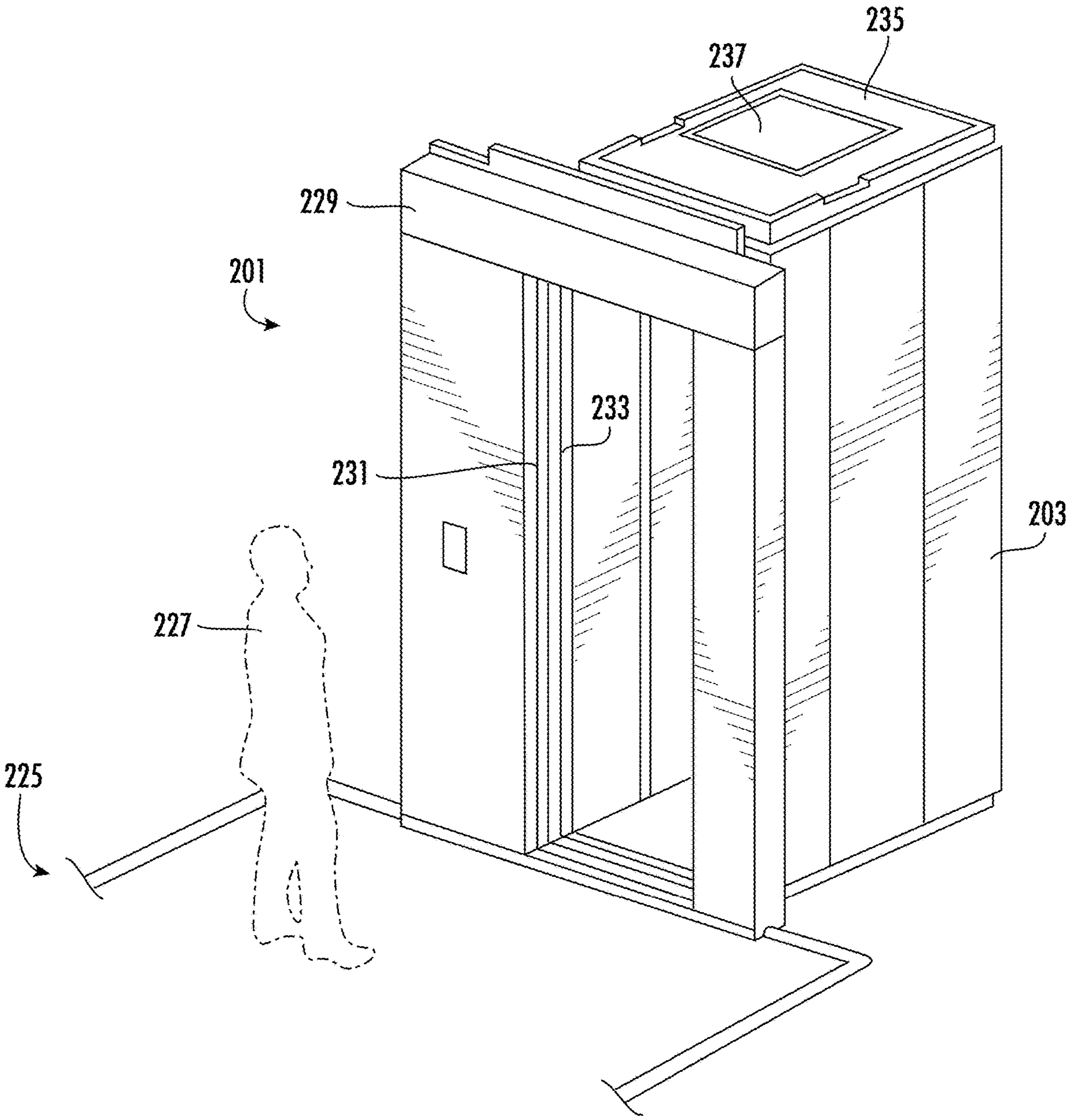
FIG. 2 is a schematic illustration of a landing door of an elevator system that may employ various embodiments of the present disclosure.

FIG. 2 is a schematic illustration of an elevator system 201 that may incorporate embodiments disclosed herein. As shown in FIG. 2, an elevator car 203 is located at a landing 225. The elevator car 203 may be called to the landing 225 by a user 227 (e.g., passenger, mechanic, emergency personnel, etc.) that desires to travel to another floor within a building, perform maintenance on a portion of the elevator system 201, or for use by emergency personnel. A car door lintel 229 of the elevator system 201 can include a door opening system or door operator to enable opening and closing of car doors 231 and landing doors 233 when the elevator car 203 is located at the landing 225. At times, such as during maintenance operations or emergency situations, a user 227 may need to access an elevator car top 235 through a ceiling access panel 237.

In conventional systems, the user 227 may be required to bring a ladder and/or other equipment into the elevator car 203, in order to reach the ceiling and thus open the ceiling access panel 237. In the case of emergency personnel, carrying additional ladders can be burdensome and/or interfere with emergency response operations. In either case, additional equipment (e.g., separate ladder) is required to be carried by the user 227. It may be beneficial to provide an emergency ladder within the elevator car 203 so that the user 227 is not required to bring/carry a ladder. In some current solutions, an emergency ladder is housed within a cabinet in the elevator car. Such cabinets occupy space within the elevator car and may spoil the overall appearance of the interior of the elevator car. In view of this, embodiments of the present disclosure are directed to an emergency ladder storage solution that does not require a separate cabinet within the elevator car.

Figure 3:
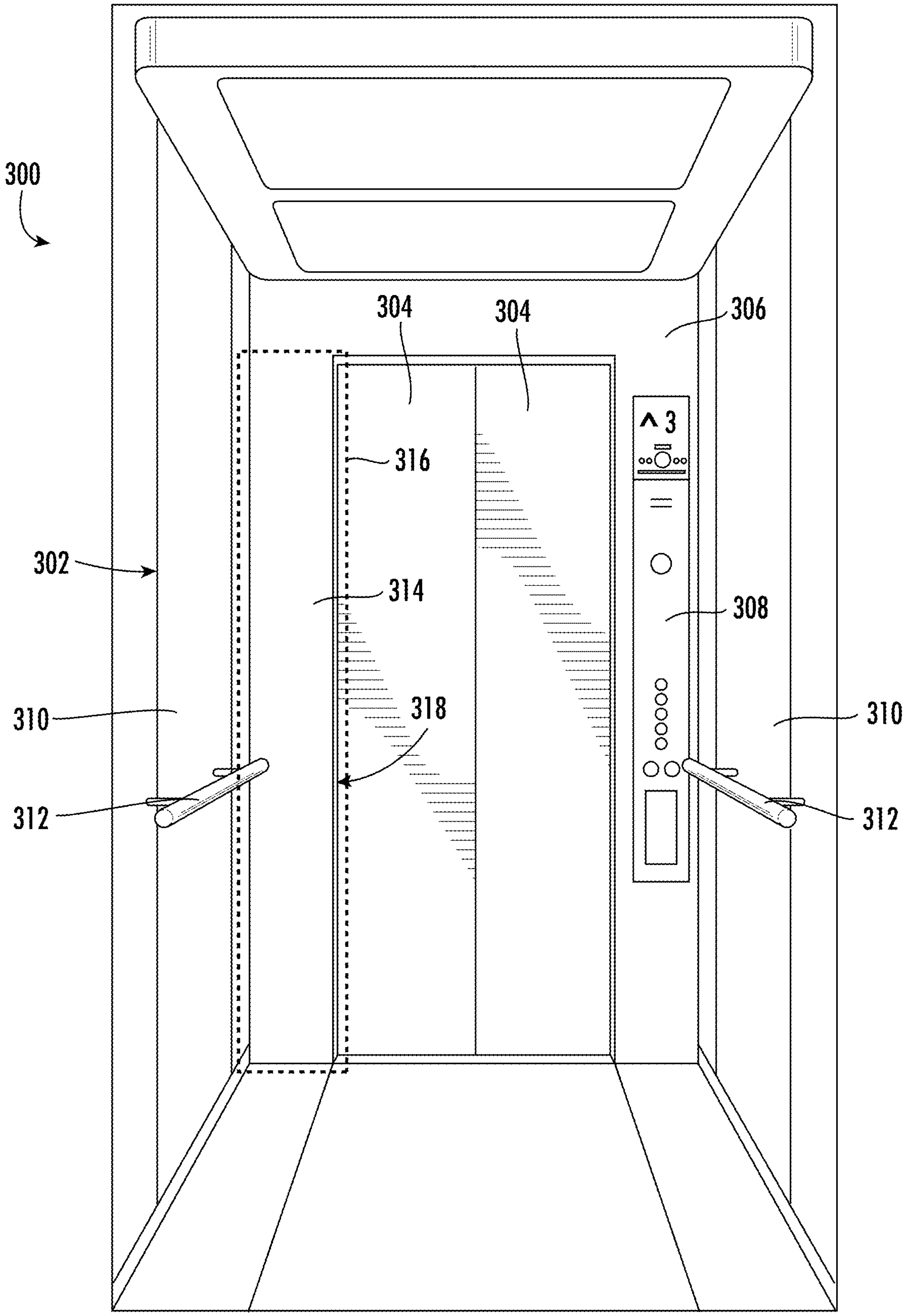
FIG. 3 is a schematic illustration of a portion of an interior of an elevator car in accordance with an embodiment of the present disclosure.

Referring now to FIG. 3, a schematic illustration of an interior 302 of an elevator car 300 is shown. The elevator car 300 may be configured similar to that described above. The elevator car 300 includes car doors 304 arranged in a front wall 306 that are openable for entry into and egress from the interior 302 of the elevator car 300 at one or more floors to which the elevator car 300 provides service. The elevator car 300 and the car doors 304 may be operable through an interface provided by a car operating panel 308. The elevator car 300 also includes side walls 310, which define portions of the interior 302 of the elevator car 300. In this configuration, the side walls 310 include handrails 312. As a result, the elevator car 300 has limited space for including additional components and/or features. As shown, there is a portion 314 of the front wall 306 that is not occupied by any features, and is located opposite the car doors 304 on the front wall 306.

In some elevator systems, a cabinet or the like may be attached or installed on the portion 314 of the front wall 306. However, such cabinets may be required to occupy a portion of the interior 302 and/or may require a door that opens into the interior 302 of the elevator car 300. Such cabinets may be used to contain an emergency ladder that may be used by authorized personnel (e.g., mechanics, emergency personnel, or the like). In accordance with embodiments of the present disclosure, an emergency ladder is configured to be stored within the portion 314 of the front wall 306 without impacting the space of the interior 302 and/or including a door on an interior facing surface 316 of the portion 314 of the front wall 306. Rather, in accordance with embodiments of the present disclosure, an emergency ladder may be installed within the portion 314 and accessed by an access panel that is on a side facing 318 of the front wall 306 that frames the doors 304, as shown and described herein.

Figure 4A:
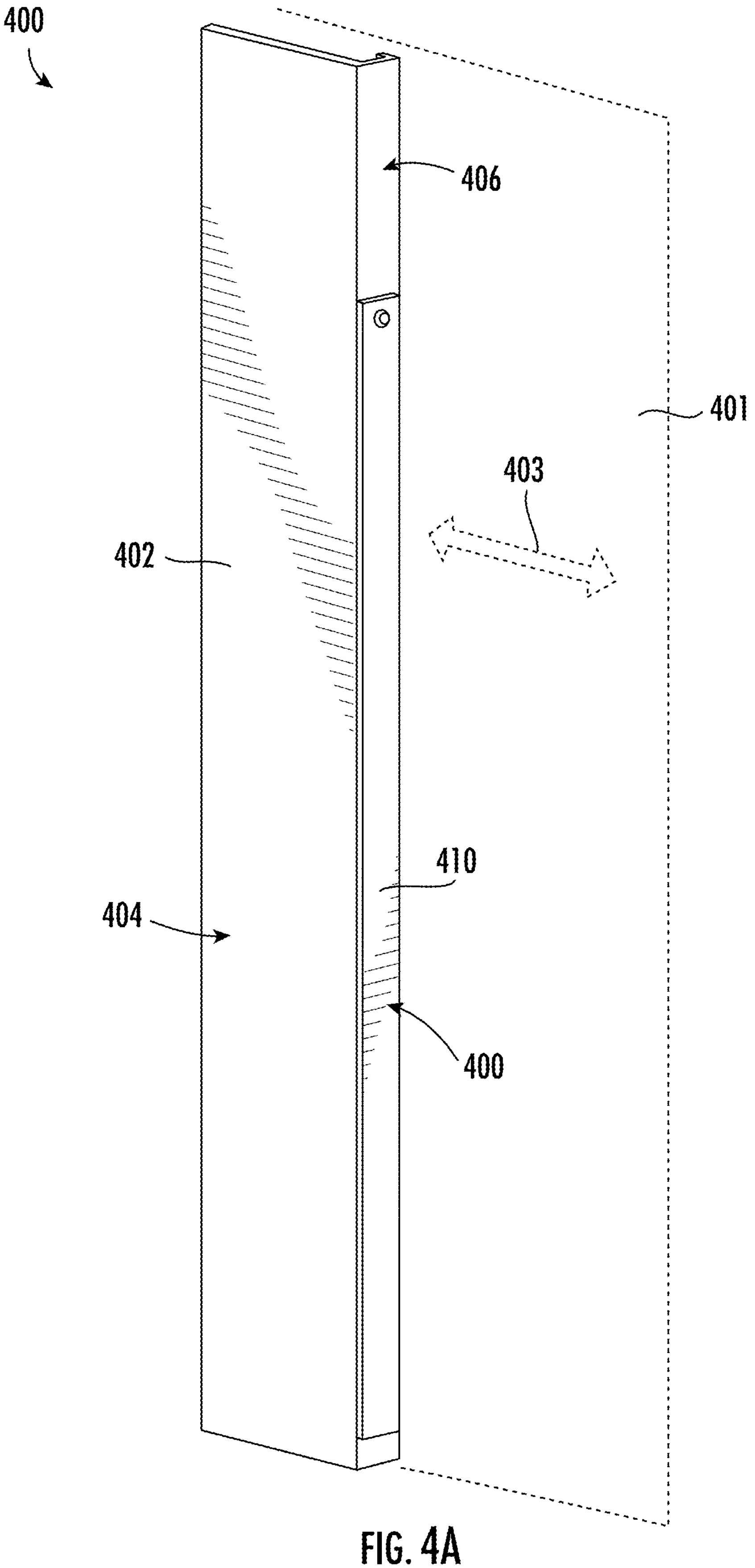
FIG. 4A is a schematic illustration of an elevator emergency ladder storage system in accordance with an embodiment of the present disclosure.
Figure 4B:
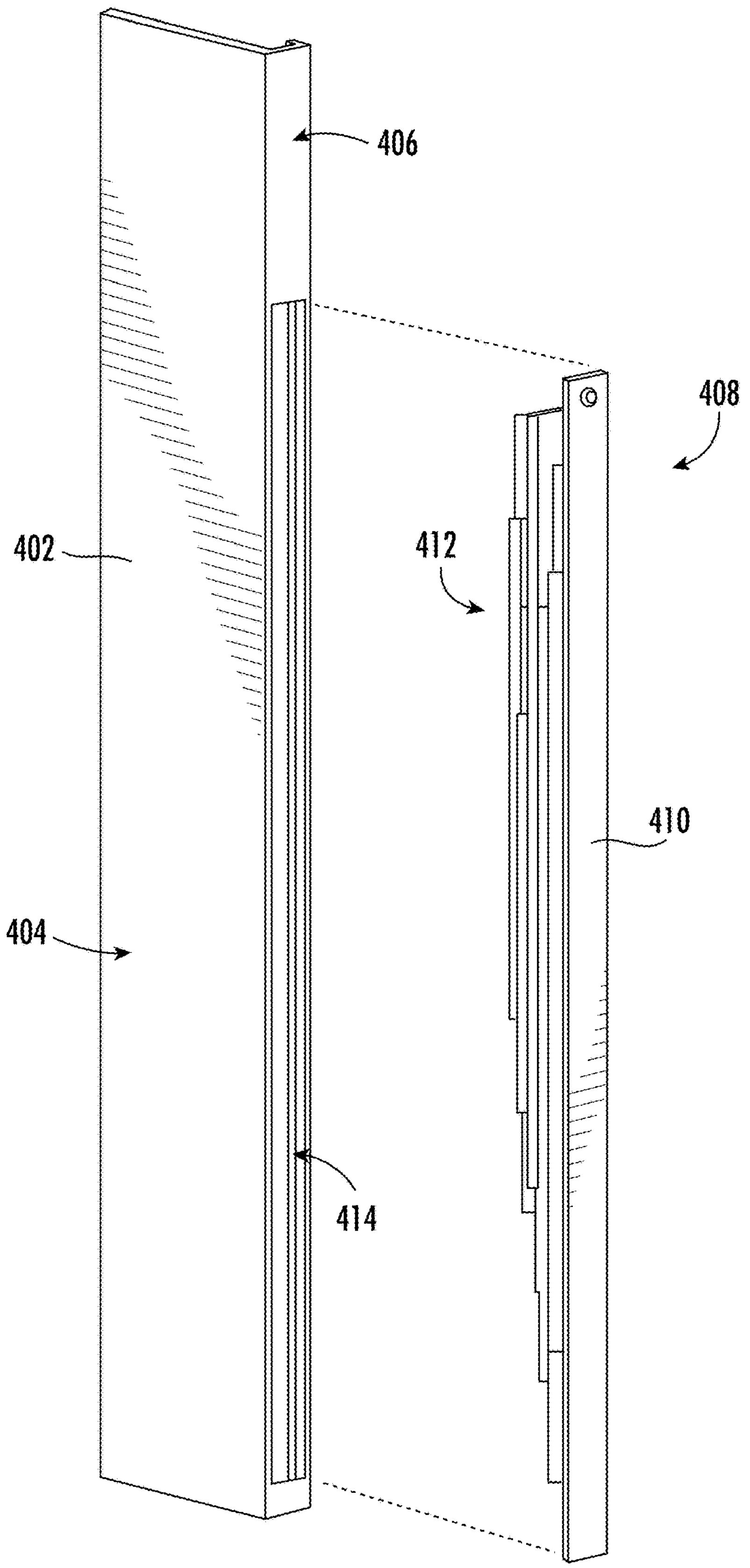
FIG. 4B illustrates the elevator emergency ladder storage system of FIG. 4A with an emergency ladder assembly removed from a storage cavity.

Referring now to FIGS. 4A-4B, schematic illustrations of an elevator emergency ladder storage system 400 are shown. The elevator emergency ladder storage system 400 may be implemented within an elevator system and/or elevator car as shown and described above. The elevator emergency ladder storage system 400 includes an elevator car front wall panel 402 that may surround and/or frame one or more elevator car doors 401, such as shown in FIG. 3. The elevator car front wall panel 402 has a cab facing surface 404 and a side surface 406 that is normal to the cab facing surface 404. The side surface 406 of the front wall panel 402 is arranged perpendicular to the cab facing surface 404 and is perpendicular to a direction of operation (arrow 403) of the elevator car door 401.

The elevator emergency ladder storage system 400 includes an emergency ladder assembly 408 that is installed into the front wall panel 402 behind the cab facing surface 404. The emergency ladder assembly 408 includes a cover plate 410 and a ladder 412 that is releasably mounted to or releasably attached to the cover plate 410. FIG. 4B illustrates the ladder 412 as stowed and supported on the cover plate 410. The cover plate 410 is configured to be releasably attached or mounted to the side surface 406, and the ladder 412 is sized and arranged to fit into a storage opening 414 defined in the side surface 406 of the front wall panel 402. As a result, the cab facing surface 404 is not impacted by the inclusion of the emergency ladder assembly 408 within the elevator car (e.g., no dedicated cabinet required).

Figure 5A:
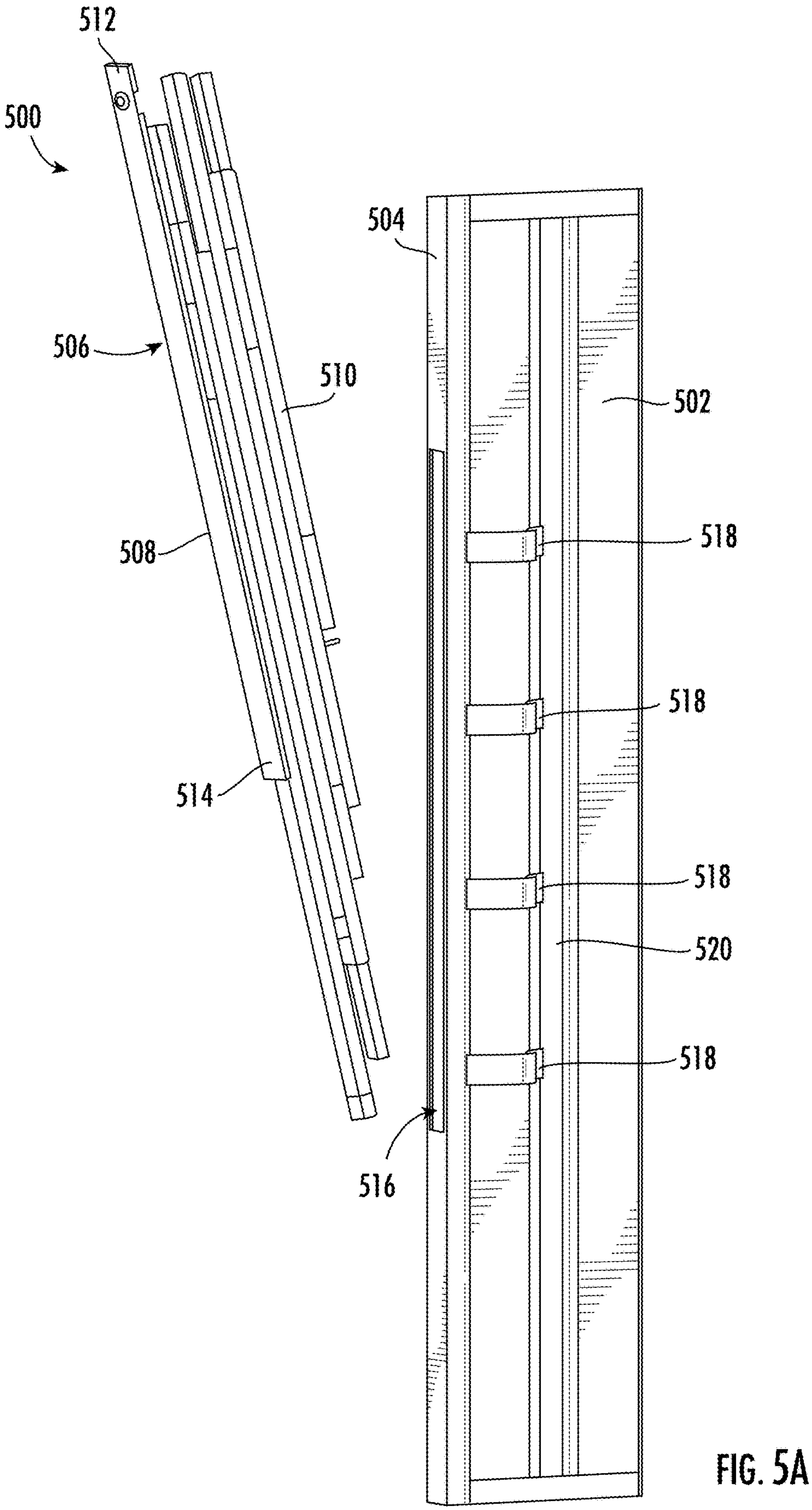
FIG. 5A is a schematic illustration of an elevator emergency ladder storage system in accordance with an embodiment of the present disclosure illustrating an angle of installation.
Figure 5B:
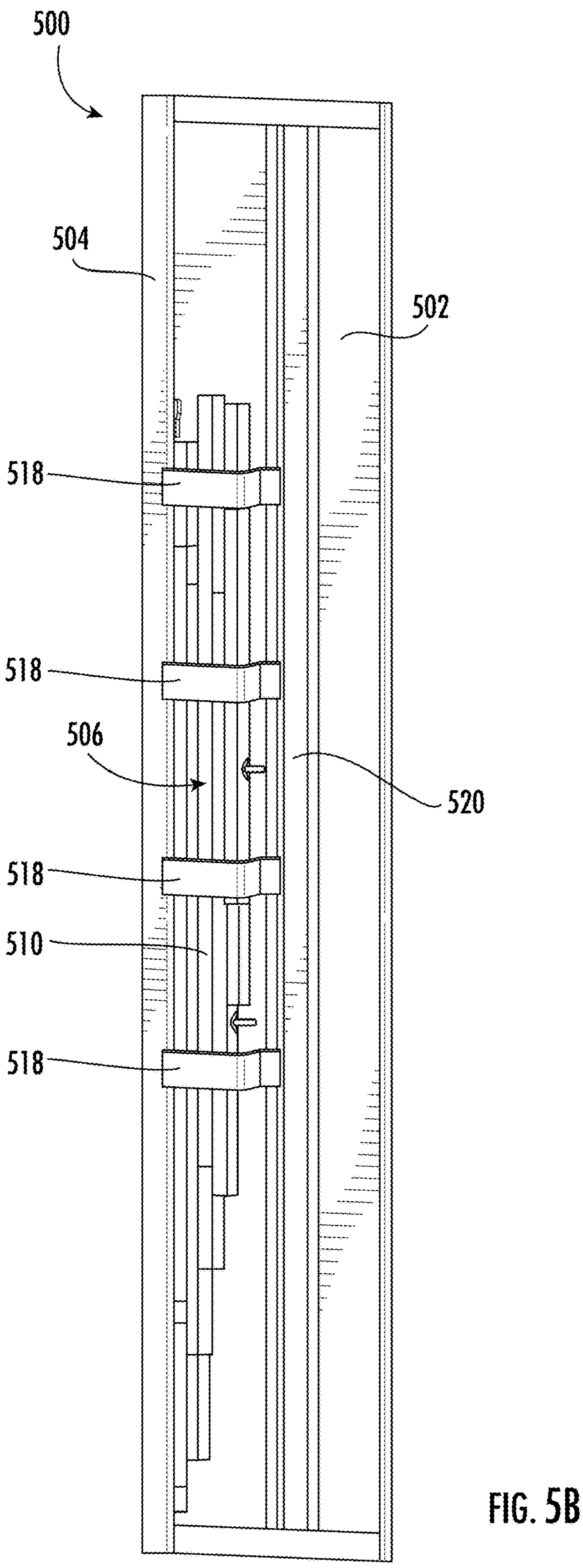
FIG. 5B illustrates the elevator emergency ladder storage system of FIG. 5A with an emergency ladder assembly installed and secured within a storage cavity.

Referring now to FIGS. 5A-5B, schematic illustrations of an elevator emergency ladder storage system 500 are shown. The elevator emergency ladder storage system 500 may be implemented within an elevator system and/or elevator car as shown and described above. The elevator emergency ladder storage system 500 includes an elevator car front wall panel 502 that may surround and/or frame one or more elevator car doors. The view of FIGS. 5A-5B is of the rear or interior of the elevator emergency ladder storage system 500 (i.e., not visible from within an elevator car). The elevator car front wall panel 502 has a cab facing surface (not visible) and a side surface 504 that is normal to the cab facing surface. The side surface 504 of the front wall panel 502 is arranged perpendicular to the cab facing surface and is perpendicular to a direction of operation of an elevator car door.

FIG. 5A illustrates an emergency ladder assembly 506 separated from the front wall panel 502 and FIG. 5B illustrates the emergency ladder assembly 506 as installed to the front wall panel 502. The emergency ladder assembly 506 includes a cover plate 508 and a ladder 510 that is removably mounted to, removably attached to, or otherwise removably connected to the cover plate 508. The cover plate 508 is configured to be releasably attached to the side surface 504 of the front wall panel 502. The cover plate 508 may have a locking mechanism arranged at a first end 512 and a fixture at a second end 514 of the cover plate 508 (described below). In accordance with some embodiments, the locking mechanism at the first end 512 may include a through hole or aperture for allowing a locking element to pass therethrough. In other embodiments, the locking mechanism may include a keyway and rotating bracket or the like, that may be rotated by operation of a key to transition the locking mechanism between locked and unlocked states. The fixture at the second end 514 may be a bracket-type or prong-type passive engagement to support the cover plate 508 at the second end 514 to engage with a part of the front wall panel 502.

The ladder 510, when mounted to the cover plate 508, is configured to fit into and through a storage opening 516 in the side surface 504 of the front wall panel 502. The size of the storage opening 516 is slightly smaller than the size or surface area of the cover plate 508. Accordingly, when the cover plate 508 is installed to the side surface 504, the storage opening 516 is completely covered and not visible. The vertical dimension of the storage opening 516 is set to receive the ladder 510 therethrough, when the ladder 510 is mounted on the cover plate 508. The ladder 510 may be inserted into the storage opening 516 at an angle, and thus the vertical size of the storage opening 516 may be less than a maximum vertical size of the ladder 510 in the mounted state (e.g., as shown in FIG. 5A).

As shown in FIGS. 5A-5B, the ladder 510 may be held in place in a stored state by one or more support brackets 518. The ladder 510 is inserted through the storage opening 516 and positioned within a storage cavity or storage space behind the front wall panel 502 (relative to an elevator passenger space) and securely held by the support brackets 518. The support brackets 518 may be provided with padding or soft material to dampen movement and/or vibrations of the ladder 510 when the ladder 510 is stowed and stored within the storage space behind the front wall panel 502. Similar material may be used to line or coat the interior surface of the front wall panel 502 to further aid in noise/vibration dampening. The support brackets 518 may be fixedly attached to or mounted to the front wall panel 502 along a frame 520. The support brackets 518 may be configured to secure the ladder 510 to prevent the ladder 510 (or parts thereof) to fall under the elevator car within the hoistway. Furthermore, advantageously and in some configurations, the support bracket 518 may provide additional support and reinforcement to the side surface 504 of the front wall panel 502. In accordance with some embodiments, by including the frame 520, the front wall panel 502 may be manufactured as an aesthetic component, with the structural aspects associated with the frame 520. In other embodiments, the frame 520 may be an integral part of the front wall panel 502.

In operation, the emergency ladder assembly 506 may normally be stowed or stored (FIG. 5B), and there would be minimal visibility or awareness of a user of the elevator that the emergency ladder assembly 506 was stored in the elevator car. However, if a user needs to access the ladder 510, the user may operate a key or the like with a locking mechanism to release the emergency ladder assembly 506. Such users may be emergency personnel that require access to the ladder 510. As noted above, the locking mechanism may be arranged at the first end 512 of the cover plate 508. The user would operate the locking mechanism to release the cover plate 508 from engagement with the side surface 504 of the front wall panel 502. The first end 512 of the cover plate 508 may then be free to tilt out of the storage opening 516 at an angle. At the second end 514 of the cover plate 508 the cover plate 508 may pivot or tilt without falling out. The user may then lift the emergency ladder assembly 506 upward and outward from the storage opening 516 to remove the emergency ladder assembly 506 and gain access to the ladder 510. The ladder 510 can be removed from the cover plate 508 and then used. After use, the ladder 510 may be reinstalled onto the cover plate 508 and then the emergency ladder assembly 506 may be inserted into the storage opening 516 with the ladder 510 being inserted into the storage space behind/within the front wall panel 502.

Figure 6A:
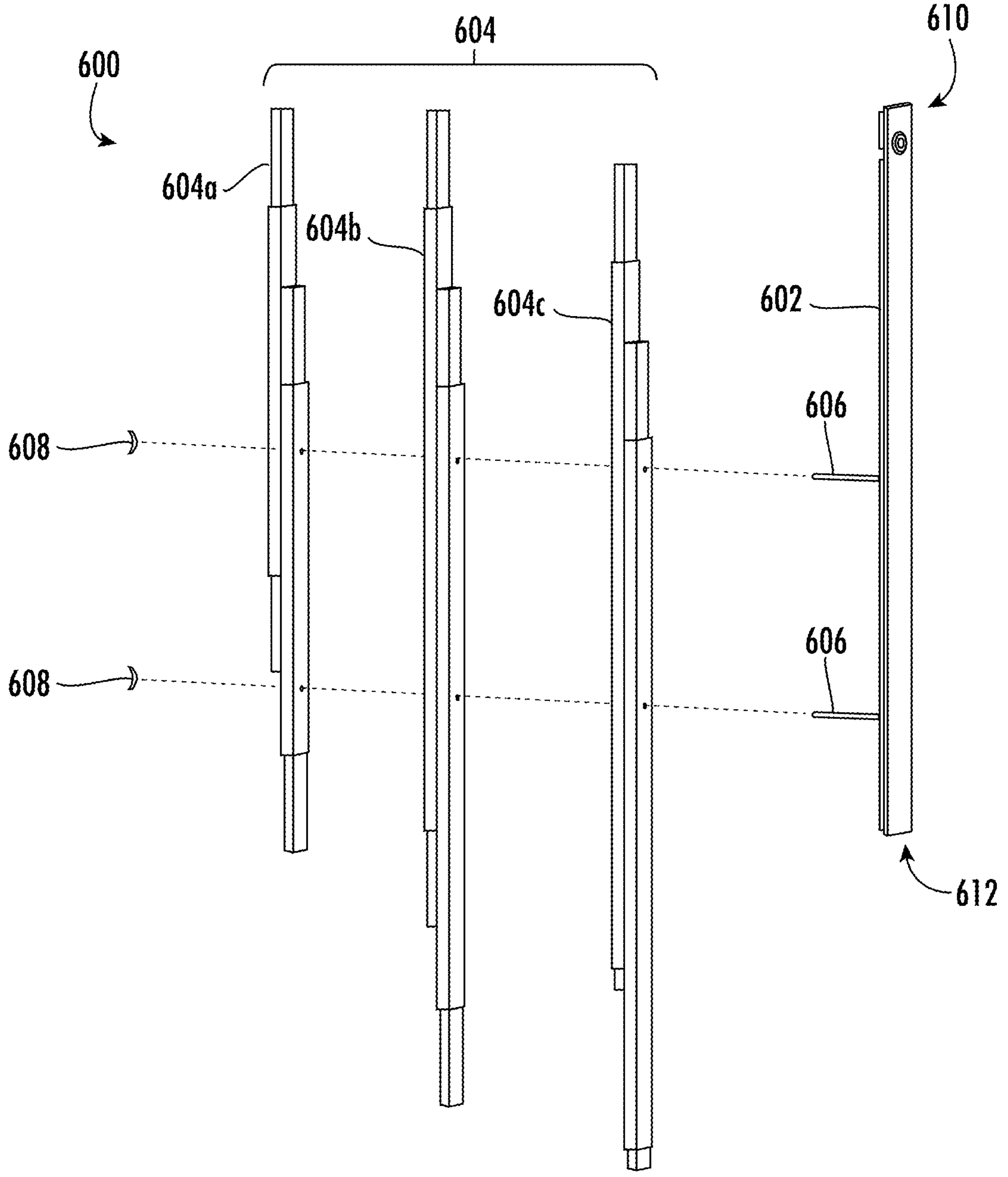
FIG. 6A is a schematic illustration of an emergency ladder assembly in accordance with an embodiment of the present disclosure.

Referring now to FIGS. 6A-6E, schematic illustrations of an emergency ladder assembly 600 in accordance with an embodiment of the present disclosure and aspects thereof are shown. FIG. 6A illustrates the component elements of the emergency ladder assembly 600 in accordance with this illustrative embodiment. The emergency ladder assembly 600 includes a cover plate 602 and a ladder 604. The ladder 604 is a sectioned assembly of ladder sections 604*a*, 604*b*, 604*c*. The ladder sections 604*a-c* are configured to be deployed and assembled into a usable ladder and then may be collapsed to a stowing state (shown in FIG. 6A). The ladder sections 604*a-c* are configured to be stacked and mounted to the cover plate 602 on one or more mounting elements 606. The mounting elements 606 may be bolts, rods, or the like, as will be appreciated by those of skill in the art. In this illustrative example, the mounting elements 606 are long bolts of sufficient length to extend through the ladder sections 604*a-c* and receive respective locking nuts 608 at an end thereof, to thereby secure the ladder sections 604*a-c* to the cover plate 602. The cover plate 602 has a first end 610 with a configuration to lockingly engage with a wall panel of an elevator car, as shown and described herein. Opposite the first end 610 is a second end 612 having a different engagement mechanism for engaging with the wall panel of the elevator car, as shown as described herein.

Figure 6B:
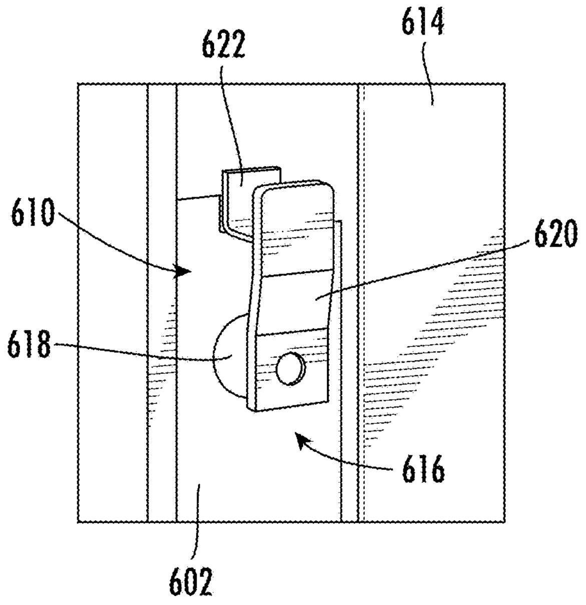
FIG. 6B illustrates a locking feature of the emergency ladder assembly of FIG. 6A in a locked state.
Figure 6C:
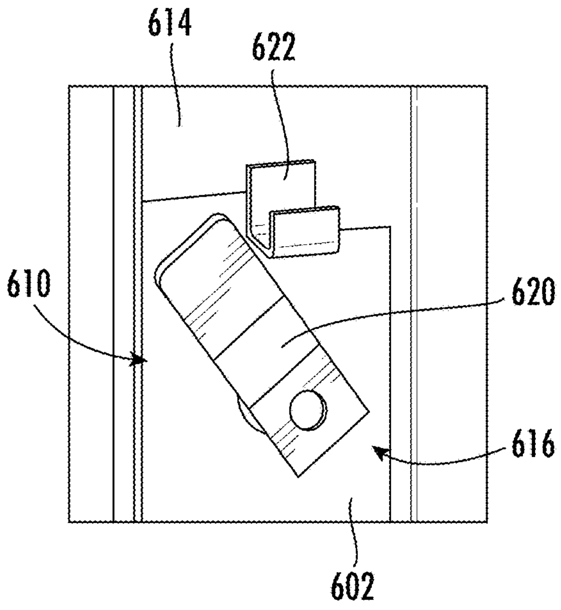
FIG. 6C illustrates the locking feature of the emergency ladder assembly of FIG. 6A in an unlocked state.

FIGS. 6B-6C illustrate enlarged views of details of the first end 610 of the cover plate 602 as interacting with a part of a wall panel 614 of an elevator car. At the first end 610 of the cover plate 602, the emergency ladder assembly 600 includes a locking mechanism 616. The locking mechanism 616 includes a keyway 618 and a rotating bracket 620. The keyway 618, in this illustrative configuration, is a shaft that is configured to receive a key, such as a triangular key as will be appreciated by those of skill in the art. When the key is used to turn the keyway (or an element thereof), the rotating bracket 620 will rotate. The keyway 618 and the rotating bracket 620 are attached to the cover plate 602. The rotating bracket 620 is configured to lockingly or securely engage with a locking tab 622 that is affixed to the interior surface of the wall panel 614. The rotating bracket 620 can be rotated into and out of engagement with the locking tab 622. When the rotating bracket 620 is rotated out of engagement with the locking tab 622, the first end 610 of the cover plate 602 may be pulled away from the wall panel 614, without the locking tab 622 interfering with movement thereof. With the locking mechanism 616 in the unlocked or release state (e.g., FIG. 6C), the cover plate 602 may be removed from the wall panel 614.

Figure 6D:
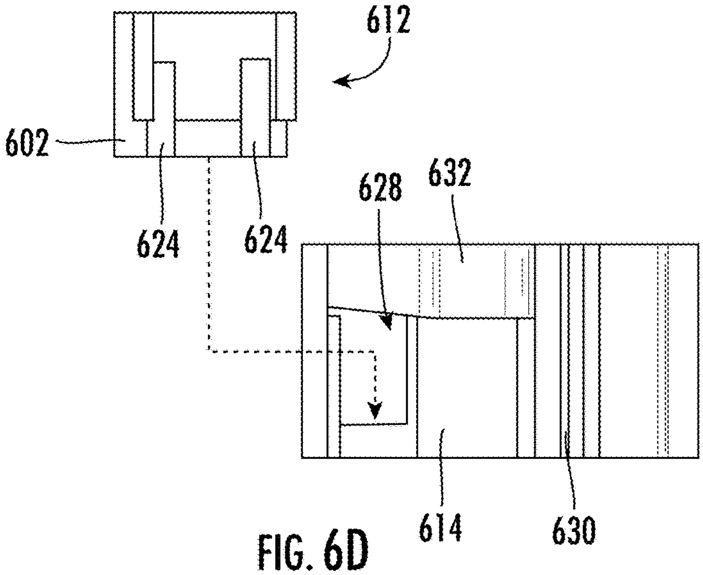
FIG. 6D illustrates an engagement mechanism of the emergency ladder assembly of FIG. 6A.
Figure 6E:
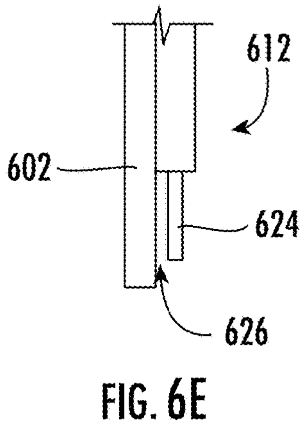
FIG. 6E illustrates a side view of the engagement mechanism of FIG. 6D.

Referring now to FIGS. 6D-6E, enlarged schematic illustrations of the second end 612 of the cover plate 602 are shown. At the second end 612, the cover plate 602 includes a fixture assembly 624 which is arranged at the second end 612 of the cover plate 602. The fixture assembly 624 includes tabs or the like that extend parallel with the cover plate 602 and define an installation gap 626 at the second end 612. The installation gap 626 is sized to receive a portion of the wall panel 614 that defines a storage opening 628. When installed in the stored or stowed state, the bottom portion of the wall panel 614 that defines the storage opening 628 is received between the second end 612 of the cover plate 602 and the fixture assembly 624. During a removal process, and the locking mechanism 616 is in an unlocked state (FIG. 6C), a user can tilt the first end 610 of the cover plate 602 out of the storage opening 628. The installation gap 626 is sized to permit the cover plate 602 to tilt outward to permit a user to lift the cover plate 602 and attached ladder 604 out of a storage space behind the wall panel 614 of the elevator car. FIG. 6D also illustrates portions of a frame 630 and a support bracket 632 similar to that shown and described with respective to FIGS. 5A-5B.

Figure 7A:
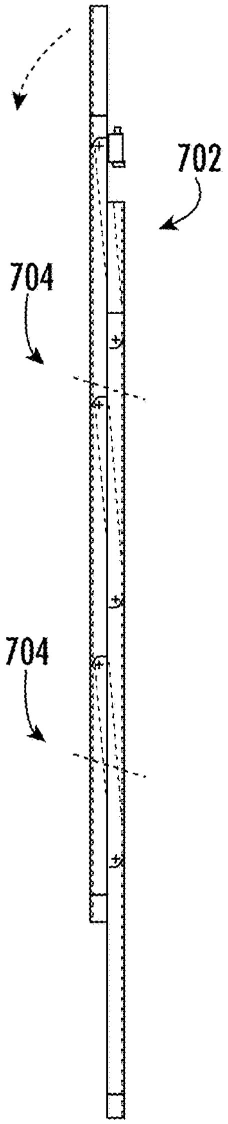
FIG. 7A is a side view of a ladder section of an emergency ladder in accordance with an embodiment of the present disclosure, shown in a collapsed or storage configuration.
Figure 7B:
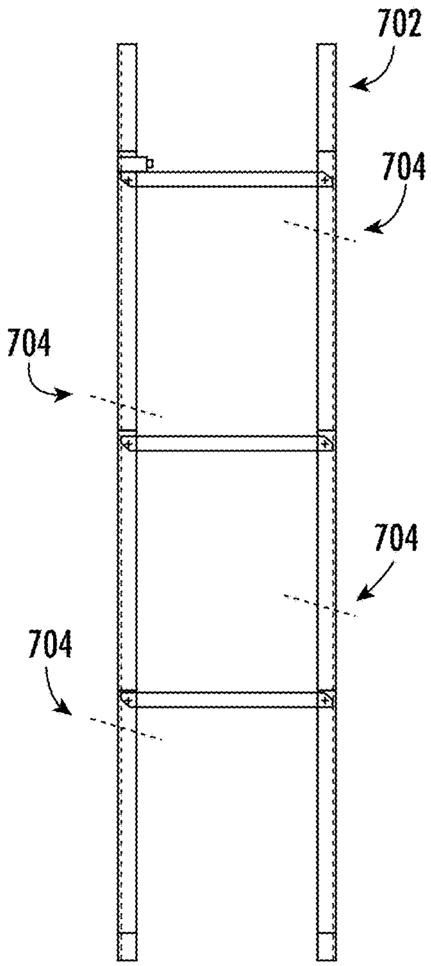
FIG. 7B illustrates the ladder section of FIG. 7A in a deployed or opened state configuration.
Figure 7C:
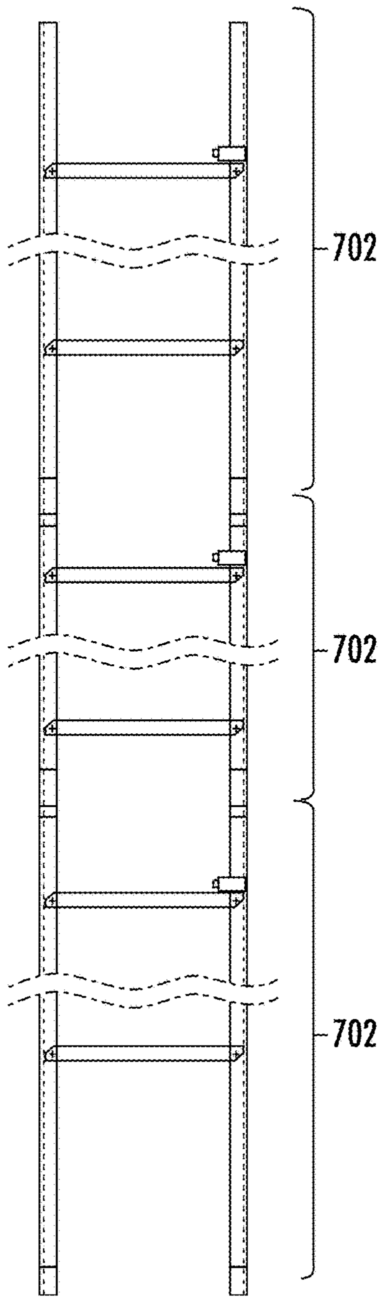
FIG. 7C illustrates an emergency ladder formed from a set of ladder sections similar to that shown in FIGS. 7A-7B.

Referring now to FIGS. 7A-7C, schematic illustrations of an emergency ladder 700 in accordance with an embodiment of the present disclosure are shown. The emergency ladder 700 is formed from a set of ladder sections 702 (one shown in FIGS. 7A-7B for simplicity and clarity), with FIG. 7C illustrating the emergency ladder 700 in the assembled state. FIG. 7A illustrates a ladder section 702 in a storage state, similar to the illustrations above. In the storage state, the ladder section 702 may be mounted or installed to a cover plate, as described above. After removing the cover plate from a wall panel of an elevator car, the ladder section 702 may be removed from the cover plate and then deployed or opened, as shown in FIG. 7B. Multiple ladder sections 702 may be installed on a cover plate and then individually removed and opened into the open or deployed state shown in FIG. 7B. The ladder sections 702 may then be assembled together to form the emergency ladder 700, as shown in FIG. 7C. The ladder sections 702 may be joined together with detent pins, locking pins, or other locking mechanisms, as will be appreciated by those of skill in the art. The ladder sections 702 may be provided as a set that is mountable to the cover plate, as shown and described above. In some embodiments, two or more of the different ladder sections 702 may be of differing heights/lengths, thereby permitting adjustability and customizability of the total length of the assembled emergency ladder 700.

Each ladder section 702 is provided with a set of mounting holes 704. The mounting holes 704 are provided in both vertical portions of the ladder sections 702 and are aligned with each other when in the stored or stowed state (FIG. 7A). When in the deployed state, the mounting holes 704 are no longer aligned because a portion of the ladder section 702 is rotated and extended, as illustratively shown in FIGS. 7A-7B. When in the stowed state (FIG. 7A), and the mounting holes 704 are aligned, a mounting element (e.g., bolt or the like) may be inserted into the aligned mounting holes 704 to mount or install the folded ladder sections 702 on a cover plate, as described above.

Figure 8:
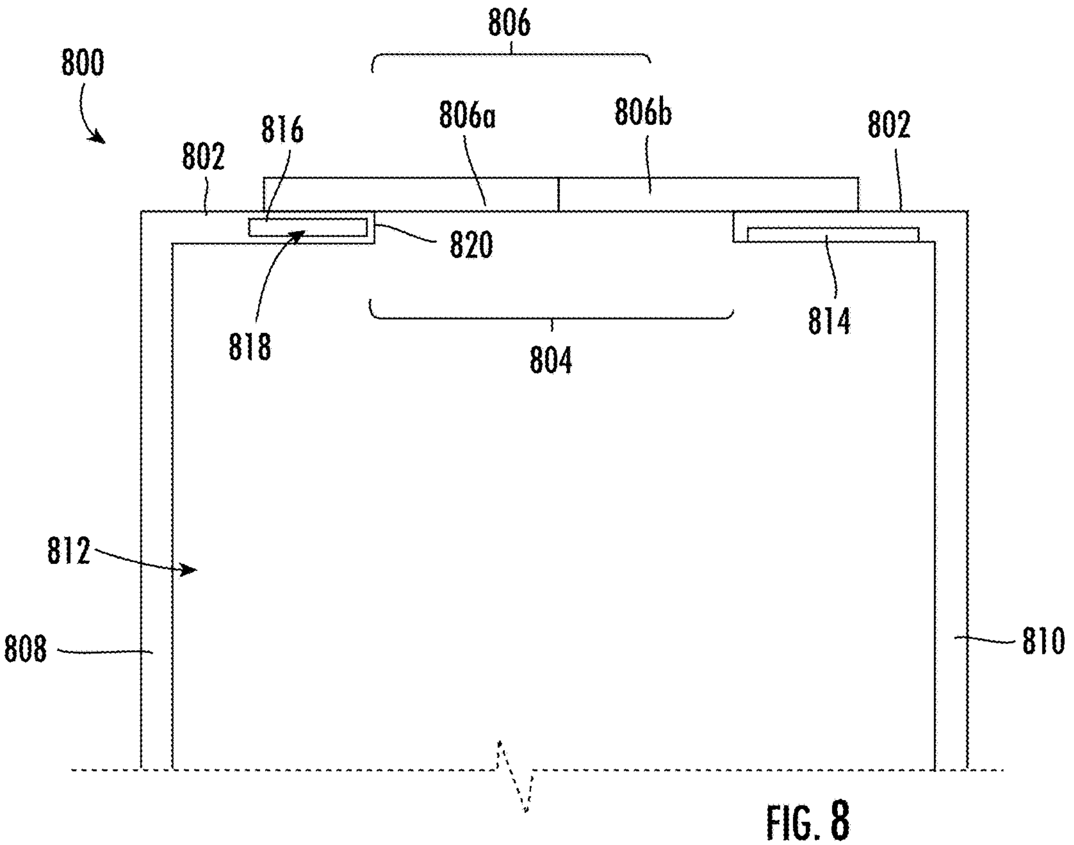
FIG. 8 is a plan view schematic illustration of an elevator car having a center opening elevator door in accordance with an embodiment of the present disclosure.

Referring now to FIG. 8, a top-down illustrative view of an elevator car 800 in accordance with an embodiment of the present disclosure is shown. In the above described embodiments, the emergency ladder is stored within a cavity of a wall of the elevator car. As shown in FIG. 8, the elevator car 800 includes a front wall panel 802 that is separated by an opening 804 for an elevator car door 806 (illustrated as having two door panels 806*a*, 806*b*). The elevator car 800 includes two side wall panels 808, 810 and a back wall panel (not shown) that define an elevator passenger space 812 therein. On the front wall panel 802, the elevator car 800 includes a car operating panel 814 that is installed into the front wall panel 802 and is at least partially arranged within a space within the front wall panel 802. In order to provide an emergency ladder assembly 816 that does not occupy a part of the elevator passenger space 812, the emergency ladder assembly 816 is installed into a storage cavity 818 defined within the front wall panel 802, opposite the car operating panel 814 relative to the elevator car door 806. The emergency ladder assembly 816 may be installed through a storage opening 820 defined in the side surface of the front wall panel 802, as shown and described above. Accordingly, the emergency ladder assembly 816 may be stored within the structure of the elevator car 800 without impacting the elevator passenger space 812 (e.g., does not occupy space and does not aesthetically change the interior of the elevator passenger space 812).

Although shown and described above with respect to a storage cavity that is defined with a portion of a front wall panel of an elevator car, embodiments of the present disclosure are not limited to this specific location. For example, referring now to FIG. 9, a top-down illustrative view of an elevator car 900 in accordance with an embodiment of the present disclosure is shown. In this non-limiting configuration, an emergency ladder assembly 902 is stored within a storage cavity 904 of an elevator car door 906 (e.g., in one elevator car door panel 906*a*, 906*b*).

Figure 9:
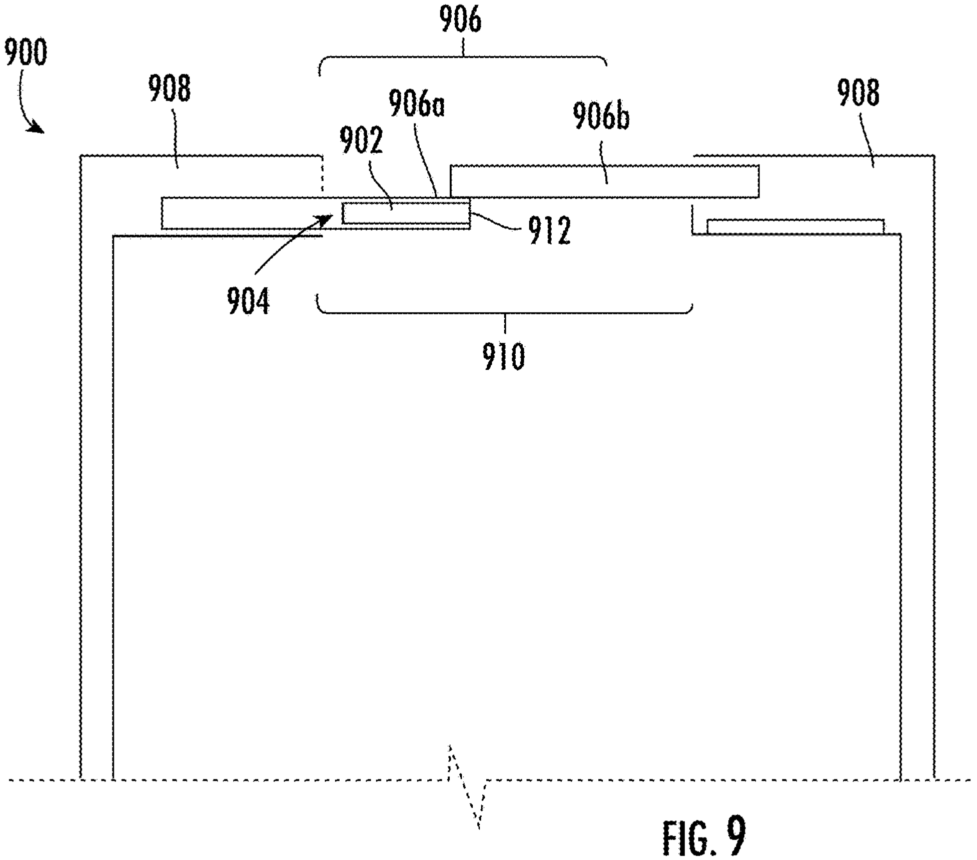
FIG. 9 is a plan view schematic illustration of an elevator car having a side opening elevator door in accordance with an embodiment of the present disclosure.

As shown in FIG. 9, the elevator car 900 includes a front wall panel 908 that is separated by an opening 910 for the elevator car door 906. In this configuration, instead of a center opening configuration (e.g., as shown in FIG. 8), the elevator car door 906 is configured in a side opening configuration. In this configuration, a storage opening may not be possible to be defined in a side surface of the front wall panel 908. Accordingly, in this embodiment, a storage opening 912 is provided on a side surface of one of the car door panels 906*a*. The emergency ladder assembly 902 is thus stored within the door panel 906*a*. The storage, retention, and operation of the emergency ladder assembly 902 is otherwise identical to the above described embodiments, and thus the similar features are not described again.

In accordance with embodiments of the present disclosure, emergency ladders for elevator systems are provided. The emergency ladders are configured to be stored within a wall panel of an elevator car and/or elevator door panel. As such, embodiments of the present disclosure provide for a system of storing an emergency ladder within an elevator car without impacting the use thereof. That is, the stored emergency ladder systems and assemblies described herein are not visible during normal operation, as the ladders are hidden behind a cover plate or the like, and mounted directly to and within a structural panel/wall/door of the elevator car. Users of the elevator system, during normal operation, will not notice such storage space and the ladder does not occupy any volume that would otherwise be used for passenger space. However, when necessary, an emergency ladder may be retrieved from the storage cavity within the wall/panel/door.

As used herein, the use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator car comprising:

a front wall panel defining an opening for an elevator car door;

an elevator car door arranged to open and close within the opening;

a storage cavity defined within a portion of one of the front wall panel and the elevator car door and located behind a cab facing surface thereof, wherein the storage cavity is defined by the cab facing surface of the respective front wall panel or elevator car door and a side surface of the respective front wall panel or elevator car door, wherein the side surface defines a part of the opening when the elevator car door is in an open state; and an emergency ladder assembly configured to be removably installed into the storage cavity, wherein a storage opening is defined on the side surface of the respective front wall panel or elevator car door, and wherein the emergency ladder assembly comprises:

a cover plate configured to be removably attached to the side surface and cover the storage opening; and an emergency ladder removably stored on the cover plate, wherein the emergency ladder is housed within the storage cavity in a stowed state.

2. The elevator car of claim 1, wherein the emergency ladder comprises a set of ladder sections that are configured to be joined together to form an emergency ladder.

3. The elevator car of claim 2, wherein the emergency ladder comprises three ladder sections.

4. The elevator car of claim 1, further comprising one or more mounting elements arranged on the cover plate and configured to receive and support the emergency ladder thereon.

5. The elevator car of claim 4, wherein the one or more mounting elements comprise bolts and locking nuts.

6. The elevator car of claim 1, wherein the cover plate has a first end and a second end, wherein the first end is configured to lockingly engage with a part of the side surface that defines the storage opening and the second end is configured to releasably engage with another part of the side surface that defines the storage opening.

7. The elevator car of claim 6, wherein the first end comprises a locking mechanism comprising a keyway and a rotating bracket, wherein the rotating bracket is configured to releasably engage with the side surface that defines the storage opening.

8. The elevator car of claim 7, wherein the rotating bracket is configured to releasably engage with a locking tab mounted to an interior surface of the side surface that defines the storage opening.

9. The elevator car of claim 6, wherein the second end comprises an engagement mechanism for engaging with the side surface that defines the storage opening.

10. The elevator car of claim 9, wherein the engagement mechanism comprises a fixture assembly that defines an installation gap for releasably engaging with a portion of the side surface that defines the storage opening.

11. The elevator car of claim 1, further comprising one or more support brackets arranged within the storage cavity and configured to support the emergency ladder when the emergency ladder is stored within the storage cavity.

12. The elevator car of claim 11, further comprising a frame element arranged on an interior surface of the respective front wall panel or elevator car door, wherein the one or more support brackets are mounted to the frame element.

13. The elevator car of claim 11, wherein the one or more support brackets are configured with padding or soft material to dampen movement and/or vibrations of the emergency ladder when stored in the storage cavity.

14. The elevator car of claim 1, further comprising a car operating panel arranged in the front wall panel opposite the storage cavity relative to the opening for the elevator car door.

15. The elevator car of claim 1, wherein the elevator car door is configured as a center opening elevator car door.

16. The elevator car of claim 1, wherein the elevator car door is configured as a center opening elevator car door, and the storage cavity is defined within the front wall panel.

17. An elevator car comprising:

a front wall panel defining an opening for an elevator car door;

an elevator car door arranged to open and close within the opening;

a storage cavity defined within a portion of the elevator car door and located behind a cab facing surface thereof, wherein the storage cavity is defined by the cab facing surface of the elevator car door and a side surface of the elevator car door, wherein the side surface defines a part of the opening when the elevator car door is in an open state; and an emergency ladder assembly configured to be removably installed into the storage cavity, wherein a storage opening is defined on the side surface of the respective front wall panel or elevator car door, and wherein the emergency ladder assembly comprises:

a cover plate configured to be removably attached to the side surface and cover the storage opening; and an emergency ladder removably stored on the cover plate, wherein the emergency ladder is housed within the storage cavity in a stowed state, wherein the elevator car door is configured as a side opening elevator car door comprising at least two door panels and the storage cavity is defined within one panel of the at least two door panels.

18. The elevator car of claim 17, wherein the emergency ladder comprises a set of ladder sections that are configured to be joined together to form an emergency ladder.

19. The elevator car of claim 17, further comprising one or more mounting elements arranged on the cover plate and configured to receive and support the emergency ladder thereon.

20. The elevator car of claim 17, wherein the cover plate has a first end and a second end, wherein the first end is configured to lockingly engage with a part of the side surface that defines the storage opening and the second end is configured to releasably engage with another part of the side surface that defines the storage opening.

* * * * *